US012304168B2

(12) United States Patent
Blezard et al.

(10) Patent No.: US 12,304,168 B2
(45) Date of Patent: May 20, 2025

(54) METHOD OF FILLING AN INSULATED SHIPPING CONTAINER WITH LOOSE-FILL ORGANIC INSULATION

(71) Applicant: Packaging Technology Group, LLC, Fall River, MA (US)

(72) Inventors: William C. Blezard, Mattapoisett, MA (US); Timothy Douglas, Pembroke, MA (US); Devan Spellman, Acushnet, MA (US)

(73) Assignee: Packaging Technology Group, LLC, Fall River, MA (US)

( * ) Notice: Subject to any disclaimer, the term of this patent is extended or adjusted under 35 U.S.C. 154(b) by 579 days.

(21) Appl. No.: 17/508,447

(22) Filed: Oct. 22, 2021

(65) Prior Publication Data

US 2023/0131560 A1 Apr. 27, 2023

(51) Int. Cl.
*B31B 50/81* (2017.01)
*B65B 1/06* (2006.01)
(Continued)

(52) U.S. Cl.
CPC ................ *B31B 50/81* (2017.08); *B65B 1/06* (2013.01); *B65B 1/16* (2013.01); *B65B 1/24* (2013.01);
(Continued)

(58) Field of Classification Search
CPC . B31B 50/81; B31B 2120/40; B31B 2110/35; B31B 2120/10; B31B 2120/20;
(Continued)

(56) References Cited

U.S. PATENT DOCUMENTS 1,065,398 A 6/1913 Scudder
1,121,072 A 12/1914 Corwin
(Continued)

FOREIGN PATENT DOCUMENTS

GB 2554127 A 3/2018
WO WO-2015121167 A1 8/2015
(Continued)

OTHER PUBLICATIONS

International Search Report and Written Opinion for International Patent Application No. PCT/US2022/046552 dated Feb. 20, 2023.

*Primary Examiner* — George R Koch
*Assistant Examiner* — Christopher C Caillouet
(74) *Attorney, Agent, or Firm* — Goodwin Procter LLP

(57) ABSTRACT

A recyclable, thermally insulated shipping container is entirely constructed from organic fiber materials in such a manner that the container is curbside recyclable without separation of component materials. The container includes a corrugated cardboard outer box having a bottom wall, a plurality of sidewalls and a top wall, a corrugated cardboard inner liner assembly comprising a corrugated cardboard inner box having a bottom wall and a plurality of sidewalls, and a corrugated cardboard lid assembly. The outer box, inner liner assembly and lid assembly cooperate to create a plurality of thermally insulated cavities which are sequentially filled and uniformly packed with pre-portioned, pre-determined volumes of loose-fill cellulose (organic fiber) insulation to create a consistent insulating value throughout the container.

18 Claims, 8 Drawing Sheets

(51) Int. Cl.

| | |
|---|---|
| ***B65B 1/16*** | (2006.01) |
| ***B65B 1/24*** | (2006.01) |
| *B31B 120/40* | (2017.01) |
| *B65D 81/38* | (2006.01) |

(52) U.S. Cl.
CPC ...... *B31B 2120/40* (2017.08); *B65D 81/3823* (2013.01)

(58) Field of Classification Search
CPC .. B31B 50/00; B65B 1/06; B65B 1/16; B65B 1/24; B65B 2220/16; B65B 5/068; B65B 55/20; B65B 61/20; B65D 81/3823; B65D 65/466
See application file for complete search history.

(56) References Cited

U.S. PATENT DOCUMENTS

| | | | | |
|---|---|---|---|---|
| 1,527,167 | A | 2/1925 | Birdseye | |
| 1,691,178 | A | 11/1928 | Beaman | |
| 1,843,038 | A | 1/1932 | Mcilvain | |
| 2,165,327 | A | 7/1939 | Zalkind | |
| 2,360,806 | A | 10/1944 | Van | |
| 2,927,720 | A * | 3/1960 | Adams | B65D 81/3858 229/193 |
| 3,565,320 | A | 2/1971 | Edward et al. | |
| 4,335,844 | A | 6/1982 | Egli | |
| 5,564,570 | A | 10/1996 | Jaszai | |
| 5,806,576 | A * | 9/1998 | Sutherlin | B65B 1/06 141/10 |
| 6,009,685 | A | 1/2000 | Dahlberg | |
| 6,761,041 | B2 | 7/2004 | Roth et al. | |
| 6,868,982 | B2 | 3/2005 | Gordon | |
| 7,328,583 | B2 | 2/2008 | Hillman et al. | |
| 7,749,923 | B2 | 7/2010 | Moore et al. | |
| 8,453,477 | B2 | 6/2013 | Crespo et al. | |
| 8,454,795 | B1 | 6/2013 | Henderson et al. | |
| 8,541,074 | B2 | 9/2013 | Babinsky et al. | |
| 8,647,717 | B2 | 2/2014 | Babinsky et al. | |
| 8,652,598 | B2 | 2/2014 | Babinsky et al. | |
| 8,763,811 | B2 | 7/2014 | Lantz | |
| 8,795,470 | B2 | 8/2014 | Henderson et al. | |
| 9,550,618 | B1 | 1/2017 | Jobe | |
| 9,751,683 | B1 | 9/2017 | Jobe | |
| 9,878,838 | B2 | 1/2018 | Kaimann et al. | |
| 9,957,098 | B2 | 5/2018 | Jobe | |
| 9,963,287 | B2 | 5/2018 | Vogel et al. | |
| 9,981,797 | B2 | 5/2018 | Aksan et al. | |
| 9,994,385 | B2 | 6/2018 | Dudi et al. | |
| 10,046,901 | B1 | 8/2018 | Jobe | |
| 10,266,332 | B2 | 4/2019 | Aksan et al. | |
| 10,357,936 | B1 | 7/2019 | Vincent et al. | |
| 10,597,219 | B2 | 3/2020 | Jobe | |
| 10,800,131 | B1 | 10/2020 | Vincent et al. | |
| 10,800,596 | B1 | 10/2020 | Vincent et al. | |
| 10,816,128 | B2 | 10/2020 | McGoff et al. | |
| 10,882,682 | B2 | 1/2021 | Collison et al. | |
| 11,040,818 | B2 | 6/2021 | Jobe | |
| 11,046,500 | B2 | 6/2021 | Collison et al. | |
| 11,066,228 | B2 | 7/2021 | Sollie et al. | |
| 11,078,008 | B2 | 8/2021 | Dankbaar et al. | |
| 11,117,731 | B2 | 9/2021 | Waltermire et al. | |
| 11,137,198 | B2 | 10/2021 | Waltermire et al. | |
| 11,161,680 | B2 | 11/2021 | Veiseh | |
| 11,214,427 | B2 | 1/2022 | Collison et al. | |
| 11,731,826 | B2 | 8/2023 | Blezard et al. | |
| 2003/0102317 | A1 | 6/2003 | Gordon | |
| 2008/0087752 | A1 | 4/2008 | Johnson et al. | |
| 2008/0196410 | A1 | 8/2008 | Primlani | |
| 2010/0044267 | A1 | 2/2010 | Tolibas-Spurlock et al. | |
| 2010/0258574 | A1 | 10/2010 | Bentley | |
| 2011/0041415 | A1 | 2/2011 | Esposito | |
| 2011/0042449 | A1 | 2/2011 | Copenhaver et al. | |
| 2011/0072847 | A1 | 3/2011 | Crespo et al. | |
| 2011/0210164 | A1 | 9/2011 | Babinsky et al. | |
| 2011/0223410 | A1 | 9/2011 | Gencer et al. | |
| 2011/0241514 | A1 | 10/2011 | Nomura et al. | |
| 2012/0279896 | A1 | 11/2012 | Lantz | |
| 2012/0312814 | A1 | 12/2012 | Tolibas-Spurlock et al. | |
| 2013/0014450 | A1 | 1/2013 | Esposito | |
| 2013/0037469 | A1 | 2/2013 | Harris et al. | |
| 2013/0112694 | A1 | 5/2013 | Bentley | |
| 2013/0312894 | A1 | 11/2013 | Babinsky et al. | |
| 2013/0344304 | A1 | 12/2013 | Babinsky et al. | |
| 2014/0360044 | A1 | 12/2014 | Smith | |
| 2015/0114872 | A1 | 4/2015 | Tolibas-Spurlock et al. | |
| 2015/0232249 | A1 | 8/2015 | Kaimann et al. | |
| 2016/0355320 | A1 | 12/2016 | Maier-Eschenlohr et al. | |
| 2017/0066582 | A1 | 3/2017 | Vogel et al. | |
| 2017/0283157 | A1 | 10/2017 | Jobe | |
| 2017/0307302 | A1 | 10/2017 | Jacobs et al. | |
| 2017/0349356 | A1 | 12/2017 | Dudi et al. | |
| 2017/0362005 | A1 | 12/2017 | Tolibas-Spurlock et al. | |
| 2018/0086538 | A1 | 3/2018 | Jobe | |
| 2018/0194534 | A1 | 7/2018 | Jobe | |
| 2018/0229916 | A1 | 8/2018 | Jobe | |
| 2018/0229917 | A1 | 8/2018 | Jobe | |
| 2018/0237206 | A1 | 8/2018 | Jobe | |
| 2018/0299059 | A1 | 10/2018 | Mcgoff et al. | |
| 2018/0305109 | A1 | 10/2018 | Jobe | |
| 2018/0334308 | A1 | 11/2018 | Moore et al. | |
| 2018/0339838 | A1 | 11/2018 | Hall | |
| 2019/0032991 | A1 | 1/2019 | Waltermire et al. | |
| 2019/0234679 | A1 | 8/2019 | Waltermire et al. | |
| 2019/0248573 | A1 | 8/2019 | Collison et al. | |
| 2019/0329962 | A1 | 10/2019 | Dankbaar et al. | |
| 2019/0359413 | A1 | 11/2019 | Sollie et al. | |
| 2019/0359414 | A1 | 11/2019 | Sollie et al. | |
| 2019/0367208 | A1 | 12/2019 | Jobe | |
| 2019/0390892 | A1 | 12/2019 | Waltermire et al. | |
| 2020/0024061 | A1 | 1/2020 | Jobe | |
| 2020/0063359 | A1 | 2/2020 | Everett et al. | |
| 2020/0079574 | A1 | 3/2020 | Caps | |
| 2020/0088458 | A1 | 3/2020 | Waltermire et al. | |
| 2020/0102134 | A1 | 4/2020 | Hall et al. | |
| 2020/0103159 | A1 | 4/2020 | Waltermire et al. | |
| 2020/0122909 | A1 | 4/2020 | Jobe | |
| 2020/0165056 | A1 | 5/2020 | Jobe | |
| 2020/0180838 | A1 * | 6/2020 | Lantz | B65D 81/3823 |
| 2020/0231365 | A1 | 7/2020 | Veiseh | |
| 2020/0262637 | A1 | 8/2020 | Tattam | |
| 2020/0290790 | A1 | 9/2020 | Mowery et al. | |
| 2020/0307895 | A1 | 10/2020 | Jobe | |
| 2020/0407147 | A1 | 12/2020 | Jobe | |
| 2021/0039869 | A1 | 2/2021 | Waltermire et al. | |
| 2021/0047102 | A1 | 2/2021 | Sollie et al. | |
| 2021/0048135 | A1 | 2/2021 | Mcgoff et al. | |
| 2021/0094746 | A1 | 4/2021 | Demarest et al. | |
| 2021/0094747 | A1 | 4/2021 | Demarest et al. | |
| 2021/0101734 | A1 | 4/2021 | Collison et al. | |
| 2021/0102746 | A1 | 4/2021 | Waltermire et al. | |
| 2021/0171271 | A1 | 6/2021 | Collison et al. | |
| 2021/0253330 | A1 | 8/2021 | Madanagopal et al. | |
| 2021/0254877 | A1 | 8/2021 | Massenzo et al. | |
| 2021/0300665 | A1 | 9/2021 | Melchor | |
| 2021/0394994 | A1 | 12/2021 | Maier-Eschenlohr et al. | |
| 2022/0002070 | A1 | 1/2022 | Moghaddas et al. | |
| 2022/0026140 | A1 | 1/2022 | Waltermire et al. | |
| 2022/0026141 | A1 | 1/2022 | Waltermire et al. | |
| 2022/0033167 | A1 | 2/2022 | Collison et al. | |

FOREIGN PATENT DOCUMENTS

| | | | |
|---|---|---|---|
| WO | WO-2018156481 | A1 | 8/2018 |
| WO | WO-2018157978 | A1 | 9/2018 |
| WO | WO-2018213470 | A1 | 11/2018 |
| WO | WO-2019113453 | A1 | 6/2019 |
| WO | WO-2019169059 | A1 | 9/2019 |
| WO | WO-2019231934 | A1 | 12/2019 |
| WO | WO-2020055821 | A1 | 3/2020 |
| WO | WO-2020072527 | A1 | 4/2020 |
| WO | WO-2020/092023 | A2 | 5/2020 |
| WO | WO-2020093009 | A1 | 5/2020 |

(56) References Cited

FOREIGN PATENT DOCUMENTS

| | | | |
|---|---|---|---|
| WO | WO-2020188324 | A1 | 9/2020 |
| WO | WO-2020263150 | A1 | 12/2020 |
| WO | WO-2021067367 | A1 | 4/2021 |
| WO | WO-2021081047 | A1 | 4/2021 |
| WO | WO-2021093996 | A1 | 5/2021 |
| WO | WO-2021163435 | A1 | 8/2021 |
| WO | WO-2022009129 | A1 | 1/2022 |
| WO | WO-2022009130 | A1 | 1/2022 |

* cited by examiner

METHOD OF FILLING AN INSULATED SHIPPING CONTAINER WITH LOOSE-FILL ORGANIC INSULATION

BACKGROUND OF THE INVENTION

(1) Field of the Invention

The instant invention relates to a recyclable, thermally insulated shipping container which is constructed from all wood fiber materials and/or other organic recyclable materials, does not contain any plastic materials and is curbside recyclable, and more particularly to a method of filling the shipping container with loose-fill cellulose to achieve a uniform density and insulating value throughout the container cavities.

(2) Description of Related Art

The shipping or transportation of various perishable materials, such as medical supplies, food, etc., frequently requires that such materials be maintained within a stable temperature range, either higher or lower than ambient temperatures to which the packaging of the materials will be exposed. Accordingly, there are various different types of temperature controlled insulated containers or shippers which are utilized for these critical applications.

In many applications, an insulated shipper comprises a cardboard outer box, inorganic insulating materials, such as a plurality of expanded polystyrene (EPS) panels or pieces for insulation, and phase change material (PCM) gel packs, bricks, etc. used to heat or cool the interior of the shipper. While the prior art shipping containers are effective for their intended purpose, the combined use of both cardboard and EPS and/or other plastic materials, in a single packaging system poses problems for recycling of the container in traditional recycling programs as the different materials must be separated for recycling of each material, or cannot be recycled at all, requiring dumping into a landfill.

Due to increasing demands from environmentally conscious businesses, customers and the general public, there is a growing need to utilize shipping and packing containers which are fully recyclable without separation of any component parts.

SUMMARY OF THE INVENTION

The present disclosure provides a unique, all organic fiber recyclable, thermally insulated shipping container which can be placed directly into the recycling stream without separation of the insulating materials and may be recycled in a such a way that any wood fiber materials are re-pulpable and capable of being converted into other paper-based products. The present disclosure further provides a method of filling the shipping container with loose-fill organic insulation to achieve a uniform density and insulating value throughout the container cavities A recyclable, thermally insulated shipping container in accordance with the teachings of the present invention is entirely constructed from organic fiber materials (container and insulation) in such a manner that the container is curbside recyclable without any separation of component materials.

The container may include a corrugated cardboard outer box having a bottom wall, a plurality of sidewalls and a top wall, a corrugated cardboard inner liner assembly including a corrugated cardboard inner box having a bottom wall and a plurality of sidewalls, and a corrugated cardboard lid assembly. In some embodiments, the sidewalls of the liner assembly may comprise paper materials.

The outer box is conventional in construction formed from a box blank secured in a square or rectangular shape along a side wall edge, with top and bottom closure flaps to create a traditional six-sided box.

The inner box is similarly conventional box construction forming a square or rectangular five-sided open top box with bottom closure flaps forming a bottom wall.

The inner liner assembly may further consist of a corrugated cardboard or paperboard liner flange having a continuous top shelf portion, a plurality of outer securing tabs projecting downwardly from an outer peripheral edge of the top shelf portion, and a plurality of inner securing tabs projecting downwardly from an inner peripheral edge of the top shelf portion.

In the assembly, the inner securing tabs of the flange are received within the sidewalls of the inner box and secured with glue to inner surfaces of inner box sidewalls. The outer securing tabs are received within the sidewalls of the outer box and secured with glue to inner surfaces of outer box sidewalls. The inner liner assembly is secured within the outer box such that the shelf portion is positioned below the top wall thereof to create a lid cavity above the shelf portion and below the top wall. The inner box forms a product cavity within the interior of the container assembly. The inner liner assembly and the outer box cooperate to form a side thermal insulating cavity between the respective sidewalls thereof.

A predetermined volume of loose-fill cellulose, or other organic fiber insulation is filled and packed within the side thermal insulating cavity to provide a predetermined thermal insulating value. In this regard, the side cavity is filled using a sequential portion, fill and pack methodology which allows the loose-fill cellulose to be packed with a consistent density throughout the cavity. Because the cavity is deeper than wide, attempting to fill and pack the cavity in a single step may results in a higher density nearer to the bottom and a lesser density at the top. A uniform insulating value is needed across the entire sidewall for a stable and consistent thermal profile. The method generally comprises portioning a first predetermined volume of loose-fill cellulose insulation in a dispensing device, dispensing the first predetermined volume of loose-fill cellulose insulation into the side fill cavity of the shipping container, and then packing the first predetermined volume of loose-fill cellulose insulation within the side fill cavity to provide first packed volume of cellulose insulation having a predetermined density and insulating value, and then sequentially repeating the steps of portioning, dispensing and packing for a second predetermined volume of loose-fill cellulose insulation.

After the sidewall cavity is filled and packed, a corrugated cardboard strengthening panel is received within a bottom portion of the outer box and positioned in adjacent facing relation with the bottom wall of the inner box. The strengthening panel thus closes the sidewall cavity and completely captures the loose fill insulation. Additionally, the outer box bottom wall and sidewalls, and the strengthening panel cooperate to form a bottom thermal insulating cavity in which another volume of loose-fill cellulose insulation is filled and packed to provide a predetermined thermal insulating value. Once filled and packed, the bottom closure flaps are closed to form the bottom wall and capture the cellulose material.

The lid assembly may comprise a thermally insulated corrugated cardboard lid box having a bottom wall, a top wall and a plurality of sidewalls which cooperate to define a thermal insulating lid cavity. Before closing the lid box, another volume of loose-fill cellulose insulation filled and packed within the lid cavity to provide a predetermined thermal insulating value. The lid assembly is then received within the lid cavity. The top flaps remain unsealed so that the end consumer or shipper can access the inner product cavity.

It can thus be seen that the side, bottom and lid insulated cavities provide a fully insulated six-sided product cavity to receive a temperature-controlled product. As known in the art, a portion of the product cavity may be filled with phase change material (PCM) packs bricks, etc., or other heating or cooling medium to provide a consistent temperature within the product cavity.

While embodiments of the invention have been described as having the features recited, it is understood that various combinations of such features are also encompassed by particular embodiments of the invention and that the scope of the invention is limited by the claims and not the description.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

DETAILED DESCRIPTION OF THE INVENTION

Figure 1:
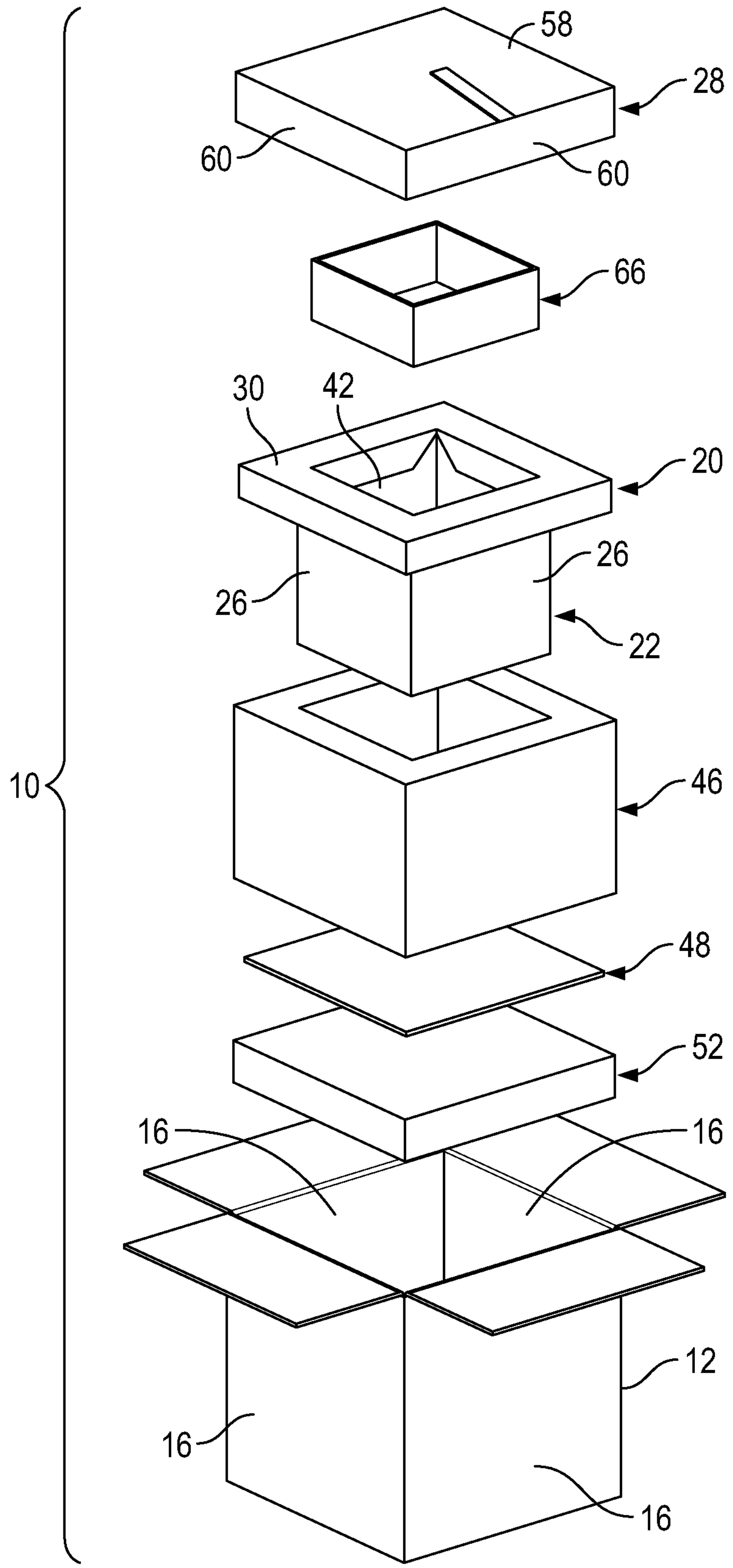
FIG. 1 is an exploded perspective view of a recyclable, thermally insulated shipping container in accordance with the teachings of the present invention.
Figure 2:
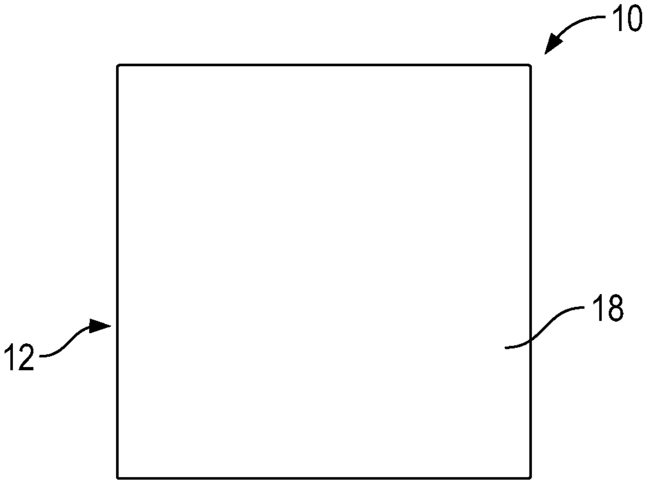
FIG. 2 is a top view thereof with the top flaps in a closed and sealed configuration.
Figure 3:
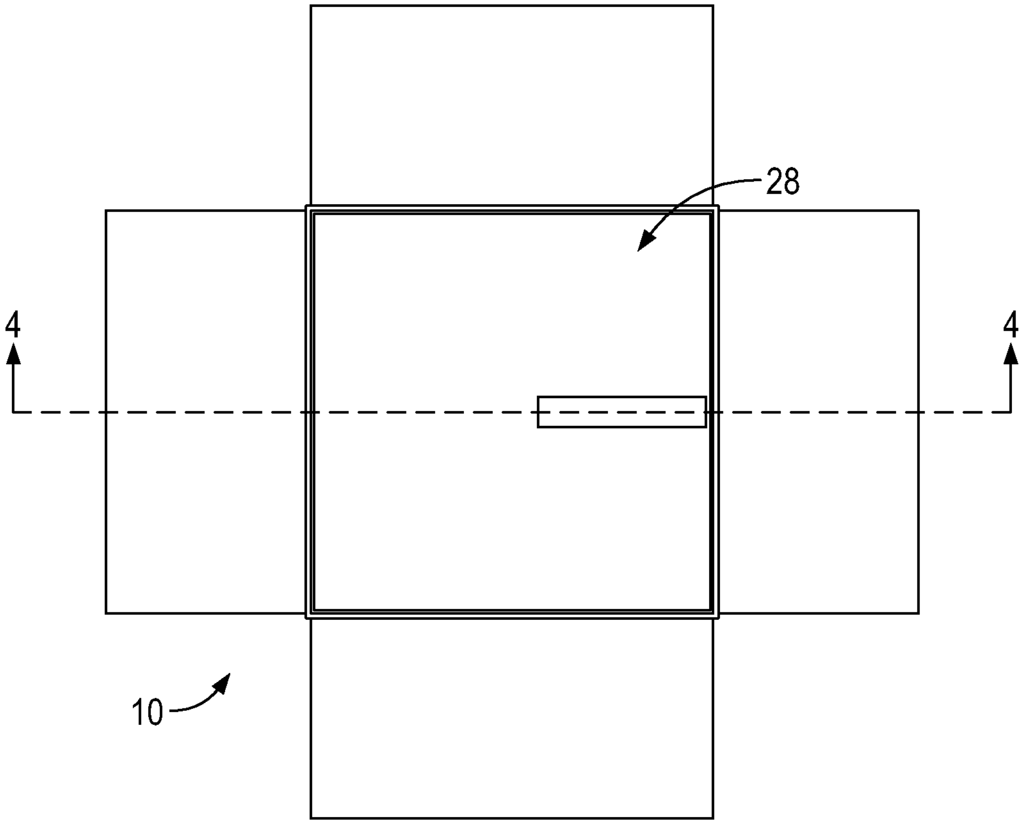
FIG. 3 is a top view thereof with the top flaps open.

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

Referring now to the drawings, a recyclable, thermally insulated shipping container according to an exemplary embodiment of the invention is illustrated and generally indicated at 10 in FIGS. 1-8.

As will be more fully described hereinafter, a recyclable, thermally insulated shipping container 10 in accordance with the teachings of the present invention may be entirely constructed from recyclable organic fiber materials (container and insulation) in such a manner that the entire container assembly 10 is curbside recyclable without any separation of component materials.

The term "recyclable organic fiber" in the context of a box material is intended to include any type of natural wood fiber or plant fiber material which can be provided as a panel or corrugated panel material, such as corrugated cardboard, for forming a box structure.

The term "recyclable organic fiber" in the context of an insulating material is intended to include any type of natural wood fiber or plant fiber materials which can be provided as a loose-fill insulating material. Exemplary materials include loose-fill cellulose insulation, other non-woven wood or paper materials, rice, hemp, flax, wool, etc.

The container 10 may include an outer box 12 having a bottom wall 14, a plurality of sidewalls 16 and a top wall 18, an inner liner assembly 20 including an inner box 22 having a bottom wall 24 and a plurality of sidewalls 26, and a lid assembly 28. The outer box 12, inner box 22 and lid assembly, may in some embodiments comprise corrugated cardboard material. In some embodiments, the inner box may be formed from an organic, wood or plant fiber material, such as a paper material or reinforced paper material, creating the inner wall with a wall thickness being significantly thinner than the previously described inner box 22, yet providing the same strength as a cardboard material to prevent perforations. In some embodiments, a liner assembly may include a double walled paper liner assembly wherein the loose-fill organic insulation material is pre-filled and sealed between inner and outer paper liner walls secured to a flange with a sealed collar configuration. In this regard, the loose-fill insulation may be pre-filled in a separate operation and then the competed liner assembly could simply be inserted into the open top of an outer box without securing the flange to the outer box 12.

The outer box 12 may be conventional box construction formed from a box blank secured in a square or rectangular shape along a side wall edge, with top and bottom closure flaps to create a traditional six-sided box.

The inner box 22 may similarly be conventional box construction forming a square or rectangular five-sided open top box with bottom closure flaps forming the bottom wall 24.

Figure 7:
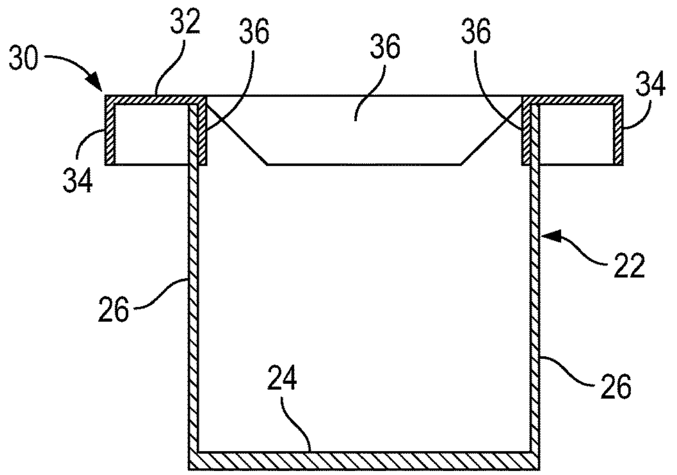
FIG. 7 is a cross-sectional view thereof taken along line 7-7.
Figure 6:
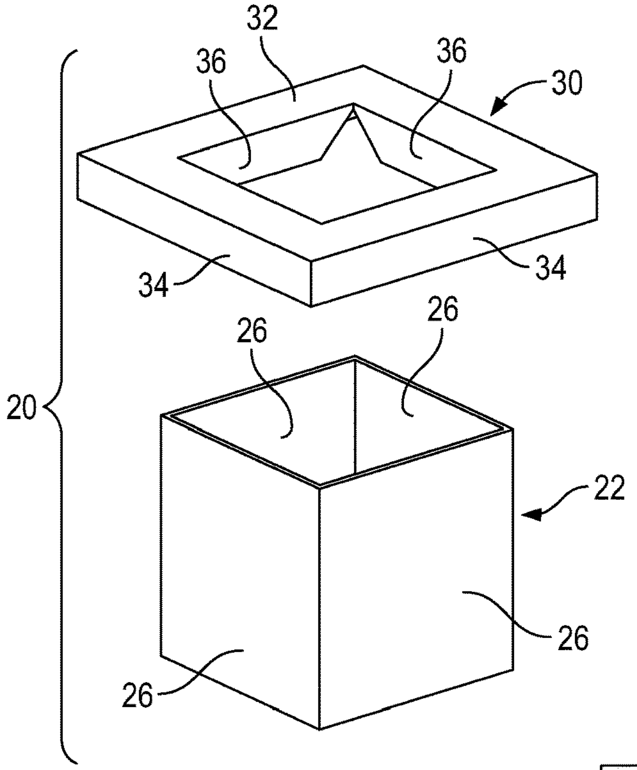
FIG. 6 is an exploded perspective view thereof.
Figure 8:
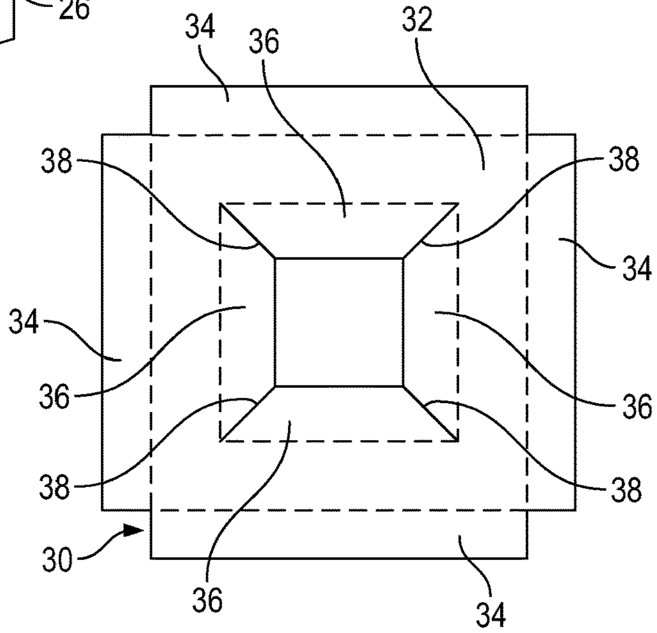
FIG. 8 is a top view of the liner flange blank.

The inner liner assembly 20 may further consist of a liner flange 30 having a continuous top shelf portion 32, a plurality of outer securing tabs 34 projecting downwardly from an outer peripheral edge of the top shelf portion 32, and a plurality of inner securing tabs 34 projecting downwardly from an inner peripheral edge of the top shelf portion 32. The liner flange 30 may be formed from corrugated cardboard or paperboard. FIG. 7 illustrates the flange 30 (die cut blank) where it can be seen that the outer tabs 34 are die cut as part of the blank and folded downwardly to provide surfaces to adhere to the outer box 12. The inner tabs 36 are similarly die cut with the blank with inwardly angled cuts 38 forming trapezoidal shaped tabs 36.

In the assembly, the inner securing tabs 36 of the flange 30 are received within the sidewalls 26 of the inner box 22 and may be secured with glue to inner surfaces of inner box sidewalls 26. After the flange 30 is assembled with the inner box 22, the outer securing tabs 34 are received within the sidewalls 16 of the outer box 12 and may be secured with glue to inner surfaces of outer box sidewalls 16. While glue is described as an exemplary method of attachment, other securing methods are also contemplated including various forms of mechanical fasteners.

Turning to the cross-sectional view in FIG. 4, it can be seen that the inner liner assembly 20 is secured within the outer box 12 such that the shelf portion 32 is positioned below the top wall 18 (or top lip) thereof to create a lid cavity 40 above the shelf portion 32 and below the top wall 18. The inner box 22 forms a product cavity 42 within the interior of the container assembly 10. The inner liner assembly 20 and the outer box 12 cooperate to form a square annular shaped side thermal insulating cavity 44 between the respective sidewalls 16,26 thereof.

Figure 4:
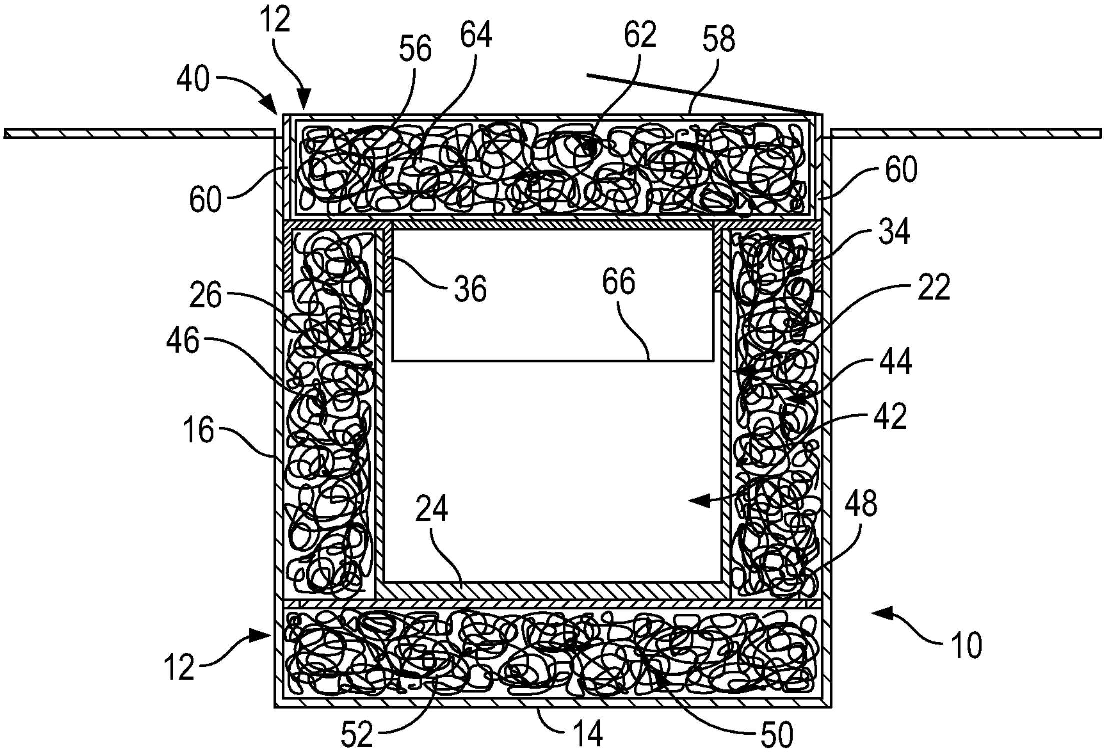
FIG. 4 is a cross-sectional view thereof taken along line 4-4 of FIG. 3.
Figure 5:
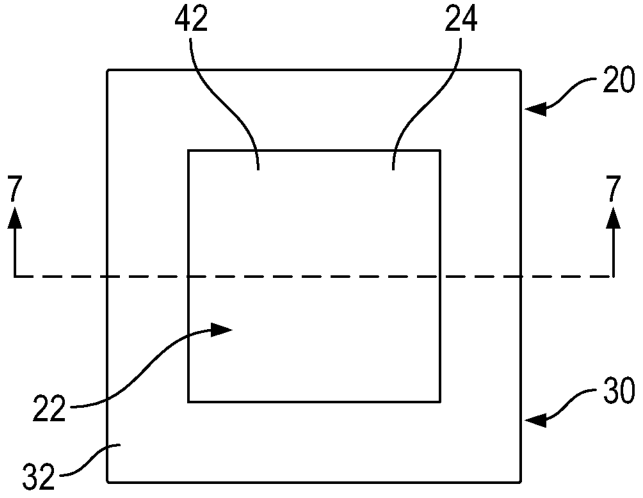
FIG. 5 is a top view of the inner liner assembly of the present shipping container.

Referring to FIGS. 1 and 4, a predetermined volume of loose-fill cellulose insulation 46 may be filled and uniformly packed within the side thermal insulating cavity 44 to provide a predetermined thermal insulating value. As noted above, loose-fill cellulose is used in the exemplary embodiments, but it should be understood that any recyclable, loose-fill, organic wood or plant fiber material may be utilized. In some embodiments, the loose-fill cellulose 46 may be portioned and packed in such a manner to provide an insulting value of between R2-6 per inch of thickness, and preferably between R4-5 per inch of thickness. The density may be in the range of 2-6 pounds of cellulose per cubic foot, and more preferably in the range of 3.5-5 pounds of cellulose insulating material per cubic foot. This packing density provides and insulating value very similar to Styrofoam EPS and thus provides a highly effective alternative. In the exemplary embodiments, the thickness of the insulating material may be about 1.0 inch to about 2.0 inch but may be as much as 4-5 inches thick depending on the application.

The loose-fill cellulose material 46 may in some embodiments comprise a borate treated loose-fill cellulose material which is fire resistant, mold, fungus, mildew, and insect resistant.

Turning to FIG. 7, it is noted that the unique die cut flange 30 allows both the outer and inner tabs 34,36 to be folded and received in downwardly extending orientations, to provide a full-length glue line around the periphery of the inner surface of the outer box 12 and to provide a tight seal around the upper peripheral edge lip of the inner box 22. Accordingly, this die cut configuration forms tight fitting interconnections between the inner and outer boxes 12,22 and the flange 30 and effectively captures and prevents the loose-fill cellulose 46 from leaking out of the side cavity 44 into the interior product cavity 42 of the box 20. While the loose-fill insulating material is advantageous for packing and recycling, the loose-fill nature of the material makes it difficult to capture and contain within enclosed spaces. Both medical and food industry customers express the need to prevent any of the cellulose material 46 from leaking into the interior of the shipper where it could contact the product being shipped.

After the sidewall cavity 44 is filled and packed, a strengthening panel 48 is received within a bottom portion of the outer box 12 and positioned in adjacent facing relation with the bottom wall 24 of the inner box 22. The strengthening panel 48 may be formed from corrugated cardboard. The strengthening panel 48 thus closes the sidewall cavity 44 and completely captures the loose fill insulation 46 within the side cavity 44. Additionally, the outer box bottom wall 14 and sidewalls 16, and the strengthening panel 48 cooperate to form a bottom thermal insulating cavity 50 in which another volume of loose-fill cellulose insulation 52 is filled and packed to provide a predetermined thermal insulating value as described hereinabove. Once filled and packed, the bottom closure flaps are closed to form the bottom wall 14 and capture the cellulose material 52 within the bottom cavity 50. The strengthening panel 48 has been found to be a critical strengthening component in drop tests to provide improved rigidity to the container 10 and prevent the loose cellulose material 46,52 from leaking (spraying or blowing) into the interior product cavity 42 due to sudden pressure forces encountered in a drop.

Referring now to FIGS. 9-19, the side and bottom cavities 44,52 of the shipping container 10 are filled using a sequential portion, fill and pack methodology which allows the loose-fill cellulose insulation to be packed with a consistent density throughout the container 10. In some embodiments, the side cavity 44 may be filled in one or more sequences. In the exemplary embodiment described below, the side cavity 44 is filled using two sequences of equal volumes of cellulose 46*a*,46*b*.

The shipping container 10 is positioned upside down with the bottom facing upwardly. In this regard, the liner flange 30 becomes the bottom of the side cavity 44 for filling.

With respect to the side cavity 44, because the cavity is deeper than wide, attempting to fill and pack the side cavity in a single-step results in a higher density nearer to the bottom and a lesser density at the top. A uniform insulating value is needed across the entire sidewall for a uniform thermal profile. Accordingly, a unique filling method, dispensing and packing system is disclosed herein to address the uniform density issues.

Figure 11:
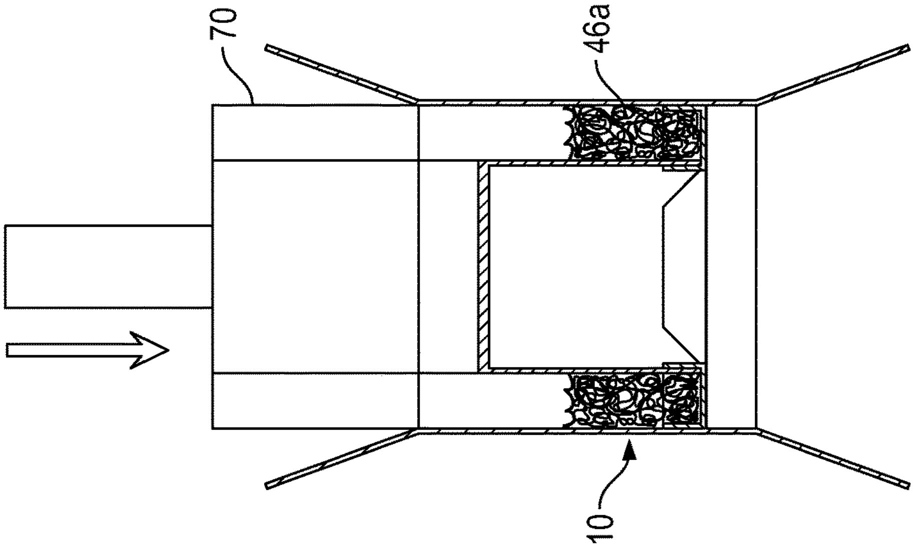
FIGS. 9-19 illustrate various sequential steps to portion, fill and pack portioned volumes of loose-fill cellulose insulation into the internal cavities of the shipping container.
Figure 10:
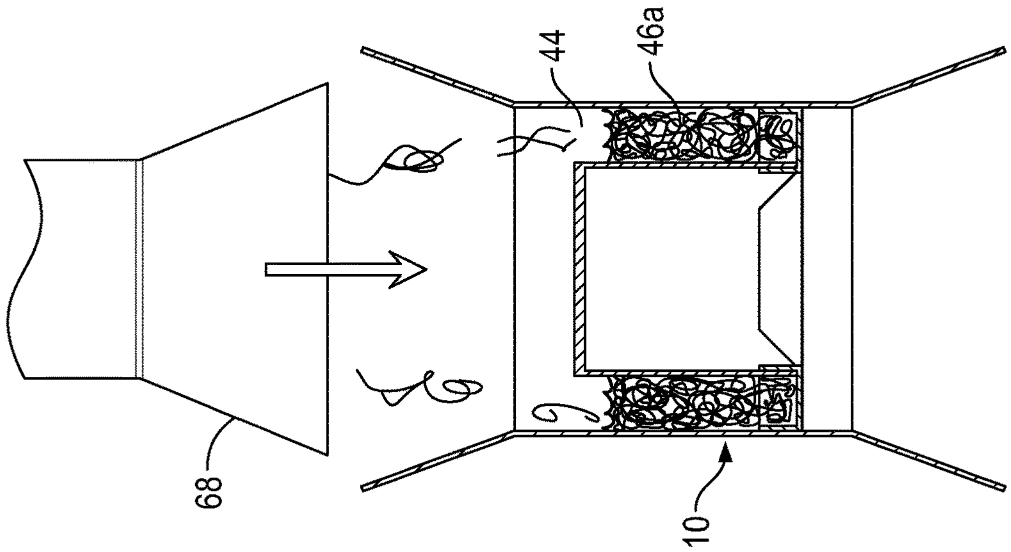
Figure 9:
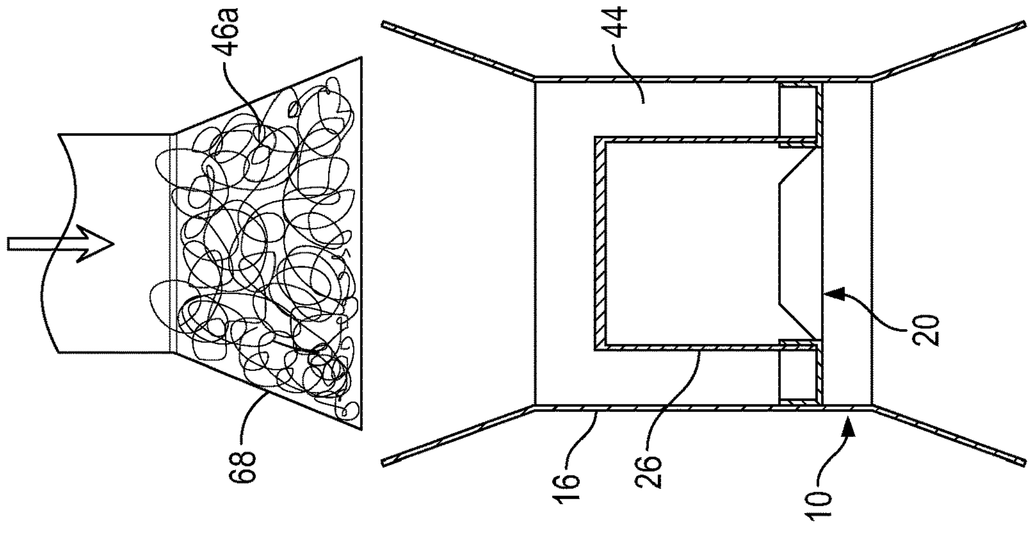
Figure 14:
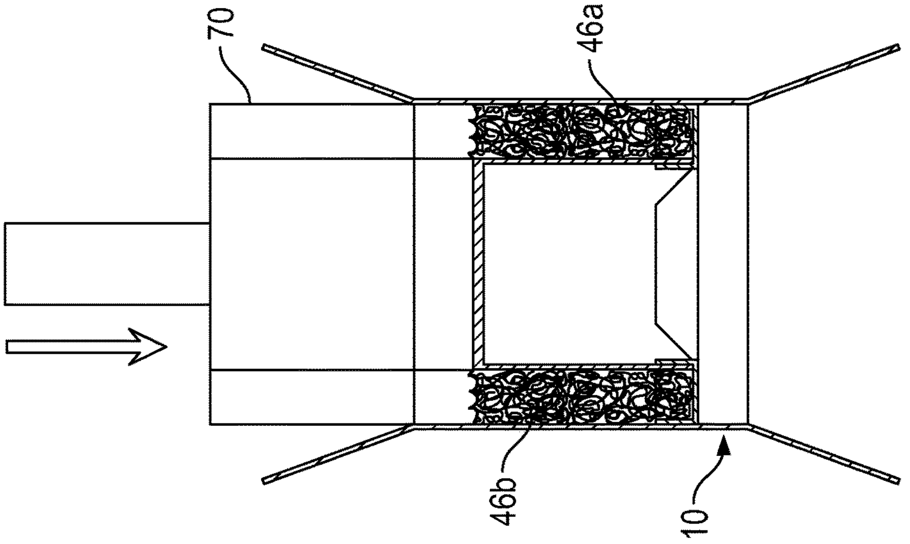
Figure 13:
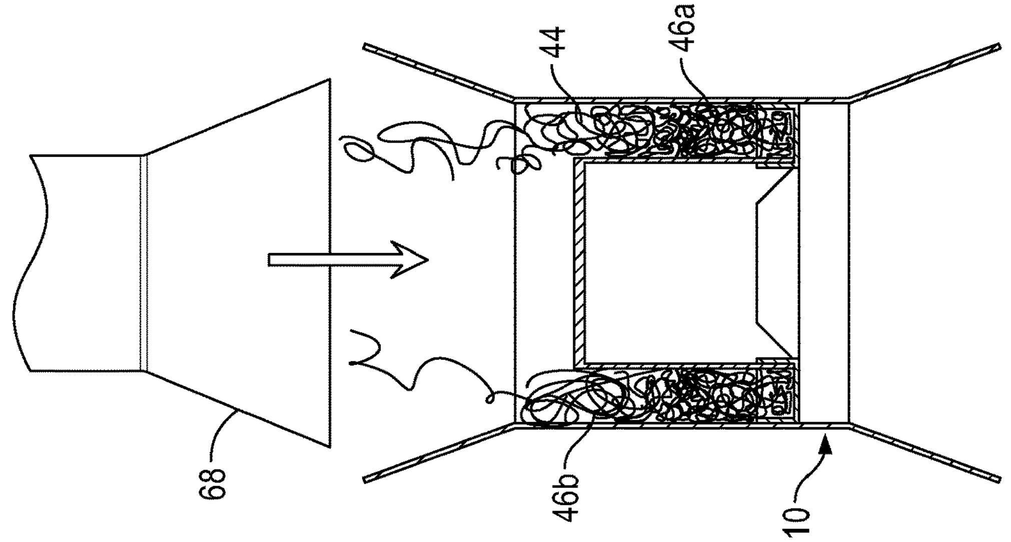
Figure 12:
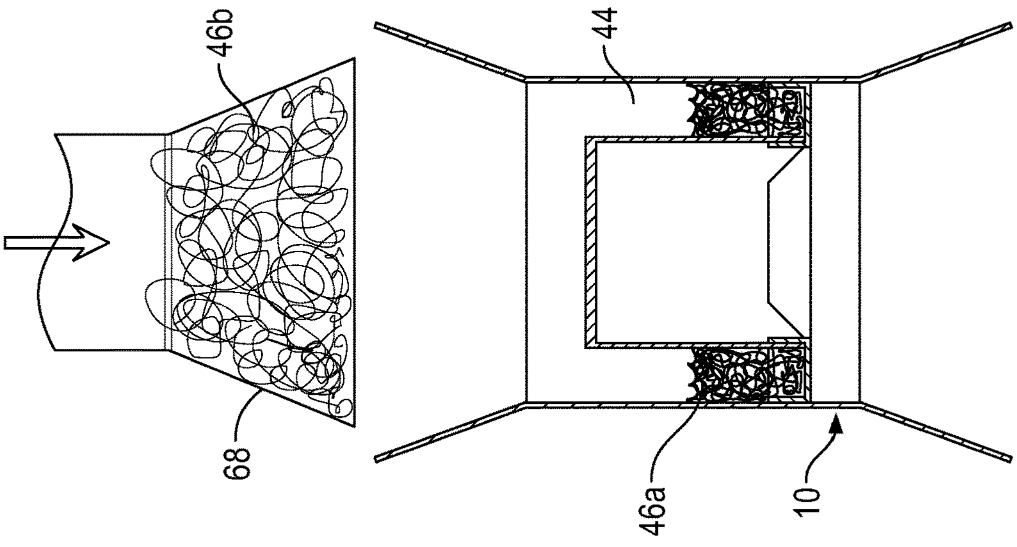

Turning to FIGS. 9-11, the method generally comprises portioning a first predetermined volume of loose-fill cellulose insulation 46*a* in a dispensing device 68 (FIG. 9), dispensing the first predetermined volume of loose-fill cellulose insulation 46*a* into the side fill cavity 44 of the shipping container 10 (FIG. 10), and then packing the first predetermined volume of loose-fill cellulose insulation 46*a* within the side fill cavity to provide a first packed volume 46*a* of cellulose insulation having a predetermined density and insulating value as described hereinabove (FIG. 11). In this exemplary embodiment, the volume of cellulose 46 to fill the entire side cavity 44 is divided into two equal portions 46*a* and 46*b* for filling.

The dispensing device 68 may comprise a conical or frustoconical hopper, or roughly trapezoidal shape hopper which receives a portioned volume of cellulose. The key design feature of the dispensing hopper being that the sidewalls of the hopper 68 are outwardly angled providing a larger dimension at the bottom end thereof. As noted above, the loose-fill cellulose material is treated with borate to provide it with enhanced chemical qualities. However, the borate also causes the loose-fill cellulose to clump and stick together somewhat. The cellulose material will not readily fall by gravity when received into a dispensing hopper with vertical sidewalls. Hence, the hopper 38 is provided with a sidewall angle that allows the cellulose material to fall out of the hopper by gravity when the hopper is opened at the bottom for dispensing into the container.

The hopper includes gated doors or flaps (not shown) at the top and bottom ends and is first filled with the predetermined volume of cellulose material 46*a* received into the dispensing hopper by means of a forced air blower system (not shown). Once the portioned volume of cellulose 46*a* is in the hopper 68, the bottom hooper gate opens to dispense, by gravity, the cellulose into the bottom end of the shipping container (FIG. 10).

The dispensed cellulose 46*a* is then packed (pressed) into a denser volume with a square annular shaped die 70 (FIG. 11). Moving to FIGS. 12-14, the filling, dispensing and packing process is repeated for a second predetermined volume 46*b* of loose-fill cellulose insulation resulting in a filled side cavity 44 with a uniformly dense layer of cellulose insulation 46.

Figure 17:
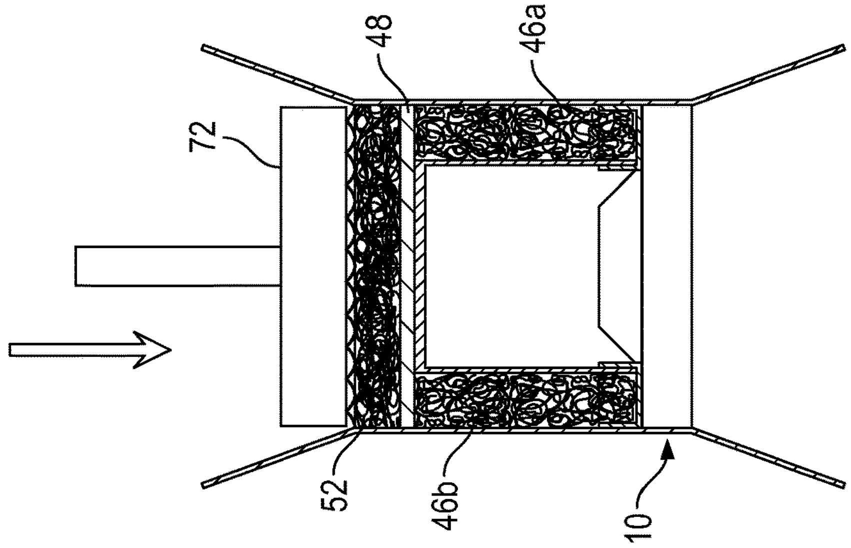
Figure 16:
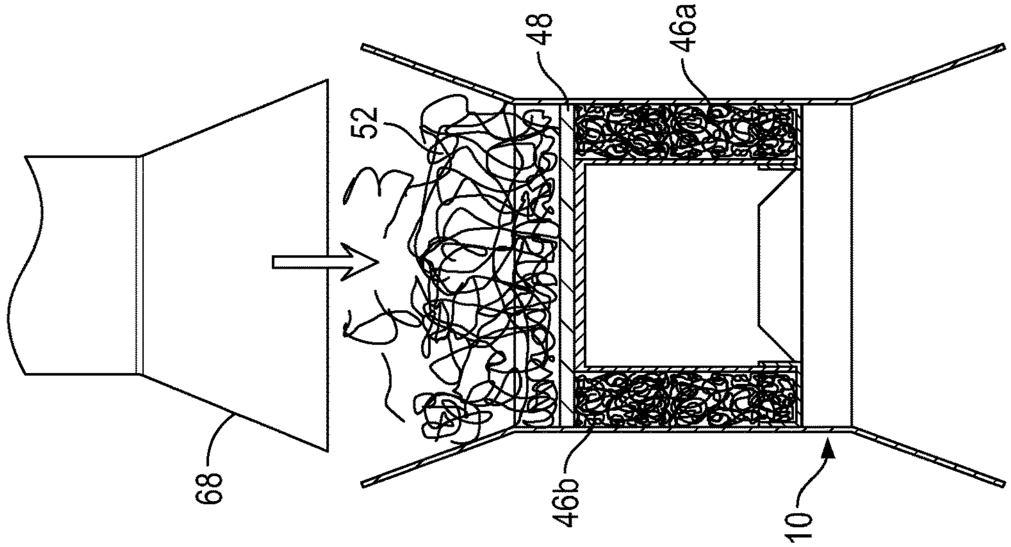
Figure 15:
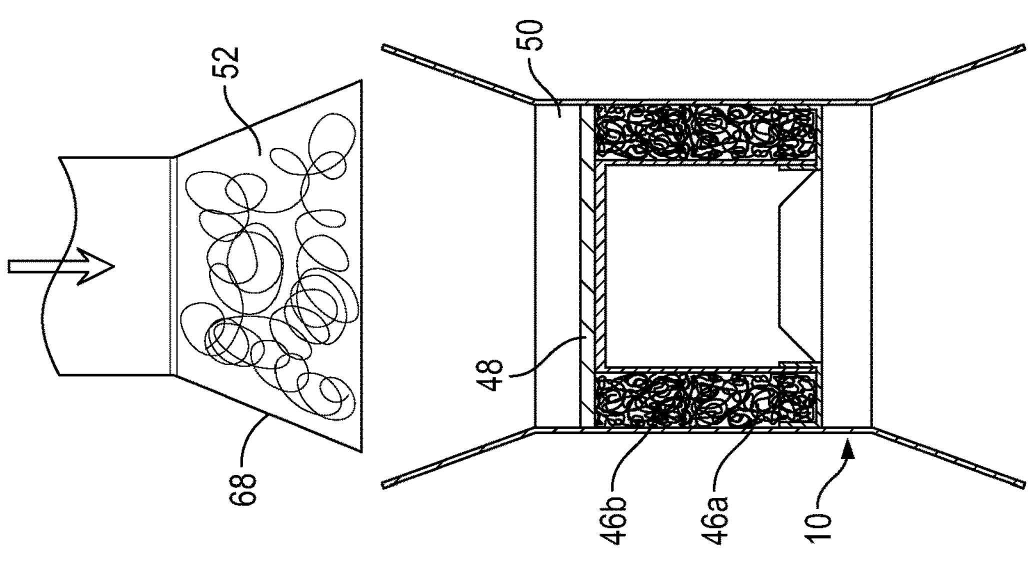

Referring to FIGS. 15-17, once the side cavity is filled, as noted above, the strengthening panel is placed inside the bottom of the container (FIG. 15).

The filling, dispensing and packing process is repeated for a third predetermined volume 52 of loose-fill cellulose insulation (flat packing die 72) resulting in a filled bottom cavity with a uniformly dense layer of cellulose insulation.

Figure 19:
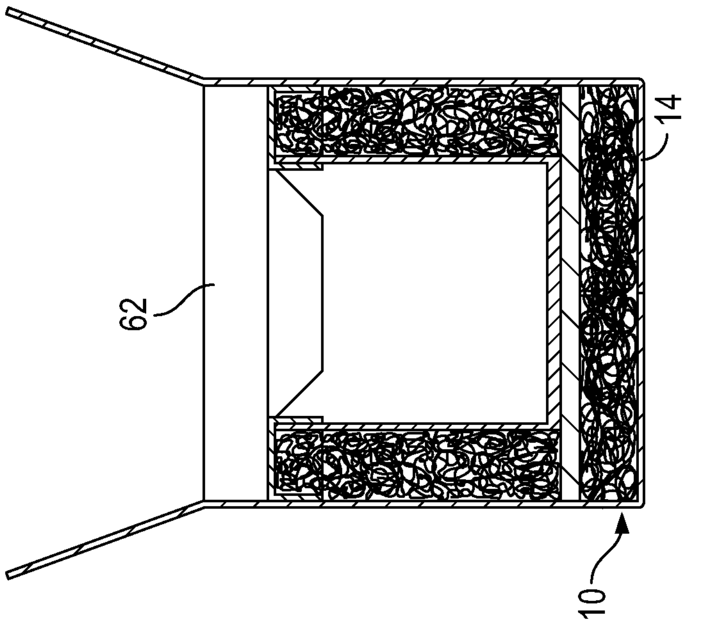
Figure 18:
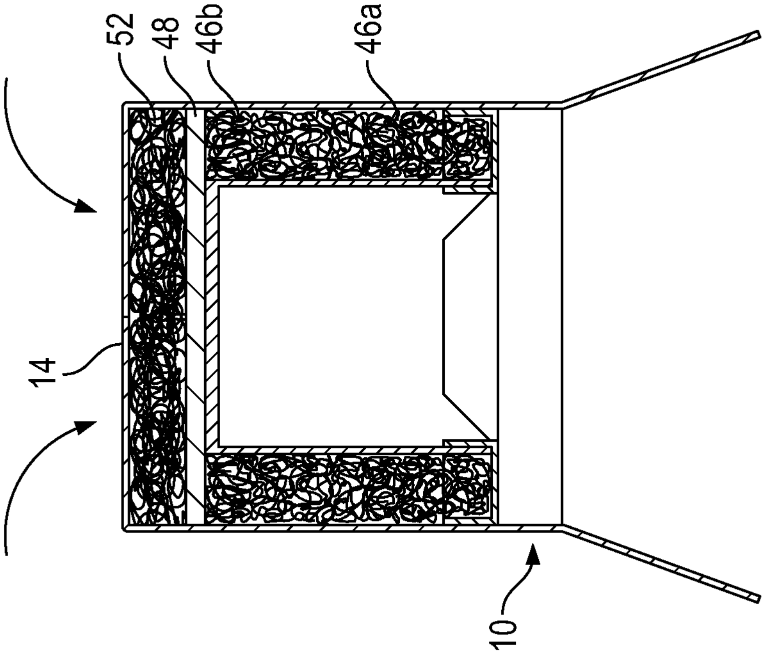

FIG. 18 illustrates the bottom flaps folded closed to seal the bottom cavity. FIG. 19 illustrates the completed container assembly inverted back to the upright position.

Turning back to FIGS. 1 and 4, the lid assembly 28 comprises a thermally insulated lid box 54 having a bottom wall 56, a top wall 58 and a plurality of sidewalls 60 which cooperate to define a thermal insulating lid cavity 62. The lid box 54 may be formed from corrugated cardboard. Before closing the lid box 54, another volume of loose-fill cellulose or organic insulation 64 is filled and packed within the lid cavity to provide a predetermined thermal insulating value (as described above). The lid assembly 28 is then received within the lid cavity 40.

The top flaps of the container 10 remain unsealed so that the end consumer or shipper can access the inner product cavity 42 for packing.

It can thus be seen that the side, bottom and lid insulation volumes 46, 52, 64 provide a fully thermally insulated six-sided product cavity 42 to receive a temperature-controlled product (now shown).

As known in the art, a portion of the product cavity 42 may be filled with phase change material (PCM) packs, bricks, etc. or other heating or cooling medium, such as dry ice, to provide a desired, consistent temperature profile within the product cavity 42. In this regard, some embodiments may further comprise a product tray 66 which receives the temperature-controlled product, separating it from a PCM material or other thermal mass (not shown) which may be positioned in a bottom portion of the inner product cavity 42.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A method of filling a shipping container with loose-fill organic fiber insulation comprising the steps of:
- providing a shipping container comprising:
  - an outer box having a plurality of sidewalls; and
  - an inner liner assembly comprising (i) an inner box having a plurality of sidewalls and (ii) a flange securing the inner box to the outer box via a plurality of securing tabs, each securing tab extending along a substantially entire corresponding edge of the flange,
  - said outer box sidewalls and said inner liner assembly defining a side fill cavity;
- portioning a first predetermined volume of loose-fill organic fiber insulation;
- dispensing the first predetermined volume of loose-fill organic fiber insulation into the side fill cavity of the shipping container; and
- packing the first predetermined volume of loose-fill organic fiber insulation within the side fill cavity to provide a first packed volume of organic fiber insulation having a predetermined density and insulating value.

2. The method of claim 1 wherein the outer and inner boxes further define a bottom cavity adjacent a bottom wall of said inner box,
- said method further comprising the step of:
- repeating the steps of portioning, dispensing and packing for a second predetermined volume of loose-fill organic fiber insulation into said bottom cavity to provide a second packed volume of organic fiber insulation having said predetermined density and insulating value.

3. The method of claim 2 wherein the first predetermined volume of loose-fill organic fiber insulation is portioned in a dispensing device comprising a generally cone-shaped portioning receptacle and wherein the steps of portioning comprise blowing the loose-fill organic fiber insulation into the receptacle.

4. The method of claim 3 wherein the step of dispensing comprises dropping the loose-fill organic fiber insulation by gravity into the shipping container.

5. The method of claim 2 wherein the step of dispensing comprises dropping the loose-fill organic fiber insulation by gravity into the shipping container.

6. The method of claim 1 further comprising the steps of
- providing a strengthening panel disposed in adjacent facing relation to a bottom wall of the inner box, said outer box and said strengthening panel further defining a bottom cavity; and
- repeating the steps of portioning, dispensing and packing for a second predetermined volume of loose-fill organic fiber insulation into said bottom cavity to provide a second packed volume of organic fiber insulation having said predetermined density and insulating value.

7. The method of claim 6 wherein the first predetermined volume of loose-fill organic fiber insulation is portioned in a dispensing device comprising a generally cone-shaped portioning receptacle and wherein the steps of portioning comprise blowing the loose-fill organic fiber insulation into the receptacle.

8. The method of claim 7 wherein the step of dispensing comprises dropping the loose-fill organic fiber insulation by gravity into the shipping container.

9. The method of claim 6 wherein the step of dispensing comprises dropping the loose-fill organic fiber insulation by gravity into the shipping container.

10. The method of claim 1 wherein the first predetermined volume of loose-fill organic fiber insulation is portioned in a dispensing device comprising a generally cone-shaped portioning receptacle.

11. The method of claim 10 wherein the step of portioning comprises blowing the loose-fill organic fiber insulation into the receptacle.

12. The method of claim 11 wherein the step of dispensing comprises dropping the loose-fill organic fiber insulation by gravity into the shipping container.

13. The method of claim 10 wherein the step of dispensing comprises dropping the loose-fill organic fiber insulation by gravity into the shipping container.

14. The method of claim 1 further comprising the step of repeating the steps of portioning, dispensing and packing for a second predetermined volume of loose-fill organic fiber insulation into said side fill cavity to provide a second packed volume of organic fiber insulation having said predetermined density and insulating value.

15. The method of claim 14 wherein the first predetermined volume of loose-fill organic fiber insulation is portioned in a dispensing device comprising a generally cone-shaped portioning receptacle and wherein the steps of portioning comprise blowing the loose-fill organic fiber insulation into the receptacle.

16. The method of claim 15 wherein the step of dispensing comprises dropping the loose-fill organic fiber insulation by gravity into the shipping container.

17. The method of claim 14 wherein the step of dispensing comprises dropping the loose-fill organic fiber insulation by gravity into the shipping container.

18. The method of claim 14 wherein said first and second predetermined volumes of loose-fill organic fiber insulation are the same.

* * * * *